(12) United States Patent
Venås et al.

(10) Patent No.: US 12,118,133 B2
(45) Date of Patent: Oct. 15, 2024

(54) HANDSHAKE CIRCUITS

(71) Applicant: Nordic Semiconductor ASA, Trondheim (NO)

(72) Inventors: Arne Wanvik Venås, Trondheim (NO); Karianne Krokan Kragseth, Trondheim (NO); Per-Carsten Skoglund, Trondheim (NO); Steffen Eidal Wiken, Trondheim (NO); Vegard Endresen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 369 days.

(21) Appl. No.: 17/718,112

(22) Filed: Apr. 11, 2022

(65) Prior Publication Data

US 2022/0335168 A1    Oct. 20, 2022

(30) Foreign Application Priority Data

Apr. 15, 2021 (GB) ..................... 2105365

(51) Int. Cl.
*G06F 21/85* (2013.01)
*G06F 1/10* (2006.01)
*G06F 13/42* (2006.01)

(52) U.S. Cl.
CPC .............. *G06F 21/85* (2013.01); *G06F 1/10* (2013.01); *G06F 13/4286* (2013.01)

(58) Field of Classification Search
CPC ......... G06F 21/85; G06F 1/10; G06F 13/4286
See application file for complete search history.

(56) References Cited

U.S. PATENT DOCUMENTS 6,247,082 B1 * 6/2001 Lo ..................... G06F 13/405
                                                    710/105
8,977,882 B2 * 3/2015 Garg ................... G06F 1/12
                                                    713/400

(Continued)

FOREIGN PATENT DOCUMENTS

WO    WO 2020/002433 A1    1/2020

OTHER PUBLICATIONS

Communication pursuant to Article 94(3) EPC issued in corresponding European Application No. 22 167 443.5-1224, dated Jul. 6, 2023, 4 pages.

(Continued)

*Primary Examiner* — Henry Tsai
*Assistant Examiner* — John B Roche
(74) *Attorney, Agent, or Firm* — Klarquist Sparkman, LLP (57) ABSTRACT

A handshake circuit portion for performing a handshake procedure to facilitate data reception by an associated circuit portion is provided. The handshake circuit portion comprises a request signal input for detecting a request signal from a further handshake circuit portion associated with a further circuit portion, an acknowledge signal output for asserting an acknowledge signal for the further handshake circuit portion, and a blocking signal input for detecting a blocking signal from the associated circuit portion. The handshake circuit portion is arranged to detect a request signal via the request signal input, determine if a blocking signal is present on the blocking signal input, and if a blocking signal is not present on the blocking signal input, respond to the request signal by asserting an acknowledge signal via the acknowledge signal output.

20 Claims, 7 Drawing Sheets

(56) References Cited

U.S. PATENT DOCUMENTS

| | | | |
|---|---|---|---|
| 9,448,951 B2* | 9/2016 | Smith | G06F 13/16 |
| 2017/0083475 A1* | 3/2017 | Wu | G06F 13/4282 |
| 2018/0004704 A1 | 1/2018 | Czakó | |
| 2019/0278357 A1* | 9/2019 | Lee | G06F 1/3234 |

OTHER PUBLICATIONS

IPO Combined Search and Examination report under Sections 17 and 18(3), mailed Jan. 12, 2022, 9 pages.
Extended European Search Report for Application No. EP 22 16 7443, dated Jul. 26, 2022, 7 pages.

* cited by examiner

HANDSHAKE CIRCUITS

CROSS-REFERENCE TO RELATED APPLICATION

This application claims priority to Great Britain Patent Application No. 2105365.7, filed Apr. 15, 2021, which application is incorporated herein by reference in its entirety.

FIELD

The present invention relates to handshake circuit portions and methods for transferring data between circuit portions.

BACKGROUND

In electronic systems such as Systems-on-Chip (SOCs), there may exist two or more clock and/or power domains—i.e. sections of the chip that run at different frequencies or with different logic voltages. Transferring data between different clock and/or power domains can be problematic, as there is no common clock with which a data transfer protocol can be synchronised or a common voltage with which data signals can be sent.

Conventionally, a handshake protocol may be used to facilitate data transfer between different domains. Typically this uses a data line (or multiple data lines for parallel data transfer), a request line and an acknowledge line between the sender and receiver, potentially with voltage level shifters to accommodate differences in logic voltages. In a four-phase handshake procedure, the sender (acting as a source) asserts the data it wishes to transfer on the data line(s) and then raises a request signal to the receiver (phase one). The receiver (acting as a sink) sees the request signal, reads the data line(s) and then raises an acknowledge signal back to the sender (phase two). The sender sees the acknowledge signal and lowers the request signal (phase three). Finally, the receiver sees the lowered request signal and lowers the acknowledge signal (phase 4). This cycle can be repeated until all of the data have been transferred. Because each bit of data is explicitly acknowledged by the receiver, the transfer can be reliable even where the sender and receiver are not synchronised or where level shifters introduce delays.

The applicant has recognised that improvements can be made to existing handshake protocols.

SUMMARY

According to a first aspect of the invention there is provided a handshake circuit portion for performing a handshake procedure to facilitate data reception by an associated circuit portion comprising:
  a request signal input for detecting a request signal from a further handshake circuit portion associated with a further circuit portion;
  an acknowledge signal output for asserting an acknowledge signal for the further handshake circuit portion;
  a blocking signal input for detecting a blocking signal from the associated circuit portion;
wherein the handshake circuit portion is arranged to:
  detect a request signal via the request signal input;
  determine if a blocking signal is present on the blocking signal input; and
  if a blocking signal is not present on the blocking signal input, respond to the request signal by asserting an acknowledge signal via the acknowledge signal output.

Thus, it will be seen by those skilled in the art that the handshake circuit portion in accordance with the invention may prevent an acknowledgement being sent while the blocking signal is present. This allows the associated circuit portion to block the data until it is ready to receive data, improving the reliability of data transfer between the circuit portions. In contrast, conventional handshake protocols always immediately acknowledge an incoming request to avoid delaying data transfer. The Applicant has recognised that whilst in some situations it may be safe to assume that the associated circuit portion is always ready to receive data, this assumption may not always be accurate and can lead to data loss and/or errors. In embodiments of the present invention, the further circuit portion (i.e. that sends the data) can be confident that the circuit portion (i.e. the receiver) has properly received the data when the acknowledgement signal is received.

Of course, when the blocking signal is not present on the acknowledgement blocking signal input, the handshake circuit portion may immediately assert an acknowledgement signal in response to the request signal, ensuring the handshake procedure is not delayed unnecessarily.

In some embodiments, the handshake circuit portion comprises an AND logic gate with the request signal input and an inverted version of the blocking signal input as inputs, and the acknowledge signal output as an output. This may represent a simple implementation of the blocking functionality.

The handshake circuit portion may comprise one or more synchronisation components provided on the request signal input, to ensure that a request signal (e.g. from a different clock or power domain) is received properly and to avoid meta-stability problems. For instance, a synchronisation component may comprise means for storing an input signal (e.g. a request signal), and for transferring the stored input signal to the rest of the handshake circuit portion (e.g. following a clock transition of a clock of the handshake circuit portion). In some embodiments a synchronisation component may comprise one or more flip-flops connected in series.

The handshake circuit portion may be configured to participate in a four-phase handshake procedure. The handshake circuit portion may be arranged to act as a receiver in a four-phase handshake procedure, with the further handshake circuit portion acting as a sender in said four-phase handshake procedure. A four-phase handshake procedure may allow the handshake circuit portion to acknowledge explicitly each bit (or set of bits) of data sent by the further circuit portion, improving reliability of data transfer. The request signal from the further handshake circuit portion may comprise the first phase in the four-phase handshake. Asserting the acknowledge signal may comprise the second phase in the four-phase handshake.

In some embodiments, the handshake circuit portion is arranged to detect whether the request signal has been lowered after asserting the acknowledge signal (i.e. phase three of a four-phase handshake). The handshake circuit portion may be arranged to lower the acknowledge signal in response to detecting that the request signal has been lowered (phase four of a four-phase handshake). The invention extends to a circuit system comprising:

a first circuit portion;

a first handshake portion according to the first aspect of the invention disclosed herein associated with the first circuit portion;

a second circuit portion connected to the first circuit portion by one or more data lines; and a second handshake circuit portion associated with the second circuit portion;

wherein the first and second handshake circuit portions are arranged to perform a handshake procedure comprising request and acknowledge signals to facilitate data transfer from the second circuit portion to the first circuit portion using the one or more data lines.

The use of the handshake circuit portions allows the first circuit portion to reliably receive data from a second circuit portion, even when the second circuit portion operates in a different domain from the first circuit portion (e.g. a different clock and/or power domain). In some embodiments, the first handshake circuit portion and the first circuit portion operate in a first domain (e.g. a first clock and/or power domain). The second handshake circuit portion and the second circuit portion may operate in a second domain (e.g. a second clock and/or power domain). The first and second domains may be different. In one set of embodiments, the circuit system comprises a first clock with a first frequency that is arranged to clock a first clock domain comprising the first handshake circuit portion and the first circuit portion; and a second clock with a second frequency that is arranged to clock a second clock domain comprising the second handshake circuit portion and the second circuit portion.

The first circuit portion may also be operable to transfer data to the second circuit portion using the one or more data lines (i.e. the circuit system may facilitate data transfer in both directions). In such embodiments, the first and second handshake circuit portions may be arranged to exchange request and acknowledge signals as part of a handshake protocol to facilitate data transfer from the first circuit portion to the second circuit portion using the one or more data lines. The second handshake circuit portion may also comprise a handshake circuit portion as disclosed herein, i.e. comprising a blocking signal input for detecting a blocking signal from the second circuit portion, to facilitate reliable data transfer in both directions. In general, features disclosed herein with respect to a handshake circuit portion may be applied to the first and/or second handshake circuit portions of the circuit system and vice-versa.

The circuit system may comprise a system on a chip (SoC), for instance wherein the first handshake circuit portion and the first circuit portion comprise a first sub-system of the SoC and the second handshake circuit portion and the second circuit portion comprise a second sub-system of the SoC.

The first and second circuit portions may be connected via a single data line, i.e. allowing a single bit of data to be transmitted per handshake cycle. In some embodiments the first and second circuit portions are connected via a plurality of data lines (e.g. forming a bus), allowing for multiple bits of data to be transferred in parallel for each handshake cycle.

The circuit system may comprise a plurality of first and second handshake circuit portions, i.e. to facilitate a plurality of parallel handshakes. In some embodiments, the circuit system may comprise up to 64 or more first and/or second handshake circuit portions.

As explained above, the use of the blocking signal prevents the request being acknowledged until the receiver is ready to receive data. This can cause unexpected delays to data transfer. In conventional handshake protocols, a sender circuit portion triggers handshake requests when it needs to transfer data. However, if delays occur with the handshake procedure the sender may attempt to trigger a further handshake request before a previous handshake is complete. This can cause errors and data loss.

In some embodiments, the second handshake circuit portion comprises:

a request signal output for asserting a request signal to the first handshake circuit portion;

an acknowledge signal input for detecting an acknowledge signal from the first handshake circuit portion;

a source command input for receiving a transmission command from the second circuit portion;

an overflow signal output for sending an overflow signal to the second circuit portion;

wherein the second handshake circuit portion is arranged:

upon receipt of a transmission command from the second circuit portion via the source command input, to perform a handshake procedure with the first handshake circuit portion by asserting a request signal via the request signal output and detecting an acknowledge signal via the acknowledge signal input; and to send an overflow signal to the second circuit portion via the overflow signal output if a further transmission command is received via the source command input before the handshake procedure is complete.

Thus, in such embodiments, the second handshake circuit portion is arranged to indicate (with the overflow signal) when a new transmission command cannot be executed because the previous handshake is not complete. The second circuit portion may then take appropriate action such as repeating the transmission command at a later time, taking compensatory measures (e.g. pausing a related ongoing process) or simply logging the occurrence of the overflow to aid debugging. This may reduce errors and data loss. A transmission command may alternatively be called a "source pulse".

The handshake procedure may be considered complete as soon as the acknowledge signal has been detected. However in some embodiments, the handshake procedure further comprises lowering the request signal on detection of the acknowledge signal and the handshake procedure may not be considered complete until the request signal has been lowered. The handshake procedure may further comprise the acknowledge signal being lowered (i.e. by the first handshake circuit portion) after the request signal is lowered. In some such embodiments the handshake procedure may not be considered complete until the second handshake circuit portion detects that the acknowledge signal has been lowered. Producing the overflow signal for any transmission command received before the acknowledge signal has been lowered further reduces the potential for errors and/or data loss because the overflow signal may be produced for any transmission command that could possibly interfere with the previous handshake.

In some embodiments, the second handshake circuit portion is arranged to provide an indication of when the handshake procedure is in progress (e.g. when either a request signal or an acknowledge signal is currently asserted). For instance, the second handshake circuit portion may comprise a handshake active signal output for asserting a handshake active signal. The second handshake circuit portion may be arranged to assert a handshake active signal when a request signal is asserted on the request signal output and/or when an acknowledge signal is detected on the acknowledge signal input. This may facilitate implementation of the overflow signal functionality by providing a single signal that indicates when a handshake procedure is underway (i.e. and thus when the overflow signal function should be active).

In some such embodiments, the second handshake circuit portion comprises an AND logic gate with the handshake active signal output and the source command input as inputs, and the overflow signal output as an output. This may represent a simple implementation of the overflow functionality.

In some sets of embodiments, additionally or alternatively, the second handshake circuit portion is arranged to indicate to the second circuit portion when the acknowledge signal is detected. The second handshake circuit portion may be arranged to indicate to the second circuit portion when an acknowledge signal is no longer asserted (i.e. once the handshake procedure is entirely complete), to ensure that actions taken by the second circuit portion in response cannot possibly interfere with an ongoing handshake procedure. For example, the second handshake circuit portion may comprise a request acknowledged signal output for asserting a request acknowledged signal, and may be arranged to assert a request acknowledged signal when the acknowledge signal is detected, or when a subsequent lowering of the acknowledge signal is detected.

The second handshake circuit portion may comprise a synchronisation component on the acknowledge signal input, to avoid meta-stability problems.

As explained above, the circuit system may facilitate data transfer in both directions. It will therefore be understood by those skilled in the art that each of the first and second handshake circuit portions can act as a sender (also referred to as a source) and a receiver (also referred to as a sink). Each or either of the first and second handshake circuit portions may comprise features providing the blocking and/or overflow functionality disclosed herein. In other words, in some embodiments the first handshake circuit portion comprises:
- a request signal output for asserting a request signal to the second handshake circuit portion;
- an acknowledge signal input for detecting an acknowledge signal from the second handshake circuit portion;
- a source command input for receiving a transmission command from the first circuit portion;
- an overflow signal output for sending an overflow signal to the first circuit portion;

wherein the first handshake circuit portion is arranged to:
- receive a transmission command from the first circuit portion via the source command input;
- perform a handshake procedure with the second handshake circuit portion by asserting a request signal via the request signal output and detecting an acknowledge signal via the acknowledge signal input; and
- send an overflow signal to the first circuit portion via the overflow signal output if a further transmission command is received via the source command input before the handshake procedure is complete.

Additionally or alternatively, in some embodiments the second handshake circuit portion comprises:
- a request signal input for detecting a request signal from the first handshake circuit portion;
- an acknowledge signal output for asserting an acknowledge signal for the first handshake circuit portion;
- a blocking signal input for detecting a blocking signal from the second circuit portion;

wherein the handshake circuit portion is arranged to:
- detect a request signal via the request signal input;
- determine if a blocking signal is present on the blocking signal input; and
- if a blocking signal is not present on the blocking signal input, respond to the request signal by asserting an acknowledge signal via the acknowledge signal output.

For instance, both of the first and second handshake circuit portions may be arranged to receive a blocking signal from the respective first and second circuit portion, which blocks the asserting of acknowledgement signals when the relevant handshake circuit portion is acting as a receiver. Both of the first and second handshake circuit portions may be arranged to send an overflow signal to the respective first and second circuit portion if they receive a further transmission command before a previous handshake procedure is complete.

According to a second aspect of the invention, there is provided a method for transferring data from a second circuit portion associated with a second handshake portion to a first circuit portion associated with a first handshake portion, the method comprising:
- the second circuit portion asserting a data signal;
- the first and second handshake circuit portions performing a handshake procedure; and
- the first circuit portion receiving the data signal;

wherein the handshake procedure comprises:
- the second handshake circuit portion asserting a request signal;
- the first handshake circuit portion detecting the request signal;
- the first handshake circuit portion determining whether the first circuit portion is ready to receive the data signal; and
- if the first circuit portion is ready to receive the data signal, the first handshake circuit portion asserting an acknowledgement signal.

The first handshake circuit portion determining whether the first circuit portion is ready to receive the data signal may comprise detecting whether a blocking signal is asserted by the first circuit portion.

In some embodiments, the handshake procedure comprises a four-phase handshake procedure. The first handshake circuit portion may detect the acknowledgement signal and lower the request signal in response. The second handshake circuit portion may detect the lowered request signal and lower the acknowledgement signal in response.

According to some embodiments of the invention, the method further comprises:
- the second handshake circuit portion initiating the handshake procedure by asserting the request signal in response to a transmission command from the second circuit portion;
- the second handshake circuit portion receiving a further transmission command from the second circuit portion; and
- the second handshake circuit portion sending an overflow signal to the second circuit portion, if the further transmission command is received before the handshake procedure is complete.

Although, as explained above, there are particular synergies between the blocking and overflow functionalities disclosed above (e.g. the overflow signal may be useful in situations where the blocking signal has caused an unexpected delay to the assertion of an acknowledge signal), the Applicant considers the overflow feature to be independently inventive and thus from a third aspect, the invention provides a handshake circuit portion for facilitating data transmission by an associated circuit portion comprising:

a request signal output for asserting a request signal for a further handshake circuit portion;

an acknowledge signal input for detecting an acknowledge signal from the further handshake circuit portion;

a source input for receiving a transmission command from the associated circuit portion;

an overflow signal output for sending an overflow signal to an associated circuit portion;

wherein the handshake circuit portion is arranged to:

receive a transmission command via the source input;

perform a handshake procedure with the further handshake circuit portion by asserting a request signal via the request signal output and detecting an acknowledge signal via the acknowledge signal input; and send an overflow signal via the overflow signal output if a further transmission command is received via the source input before the handshake procedure is complete.

This third aspect of the invention extends to a circuit system comprising:

a first circuit portion;

a first handshake portion associated with the first circuit portion;

a second circuit portion connected to the first circuit portion by one or more data lines; and a second handshake circuit portion according to the second aspect of the invention disclosed herein and associated with the second circuit portion;

wherein the first and second handshake circuit portions are arranged to perform a handshake procedure comprising request and acknowledge signals to facilitate data transfer from the second circuit portion to the first circuit portion using the one or more data lines.

According to a fourth aspect of the invention, there is provided a method for transferring data from a second circuit portion associated with a second handshake portion to a first circuit portion associated with a first handshake portion, the method comprising:

the second circuit portion asserting a data signal;

the second circuit portion sending a transmission command to the second handshake circuit portion;

the first and second handshake circuit portions performing a handshake procedure; and the second circuit portion sending a further transmission command to the second handshake circuit portion;

the second handshake circuit portion sending an overflow signal to the second circuit portion, if the further transmission command is received before the handshake procedure is complete; and the first circuit portion receiving the data signal.

Features of any aspect or embodiment described herein may, wherever appropriate, be applied to any other aspect or embodiment described herein. Where reference is made to different embodiments, it should be understood that these are not necessarily distinct but may overlap. It will be appreciated that all of the preferred features of the first and/or second handshake circuit portions according to the first aspect described above may also apply to the first and/or second handshake circuit portions according to other aspects of the invention. For instance, a single handshake circuit portion may comprise both the blocking functionality of the first and second aspects (when acting as a receiver) and the overflow functionality of the third and fourth aspects (when acting as a sender).

BRIEF DESCRIPTION OF DRAWINGS

One or more non-limiting examples will now be described, by way of example only, and with reference to the accompanying figures in which.

DETAILED DESCRIPTION

Figure 1:
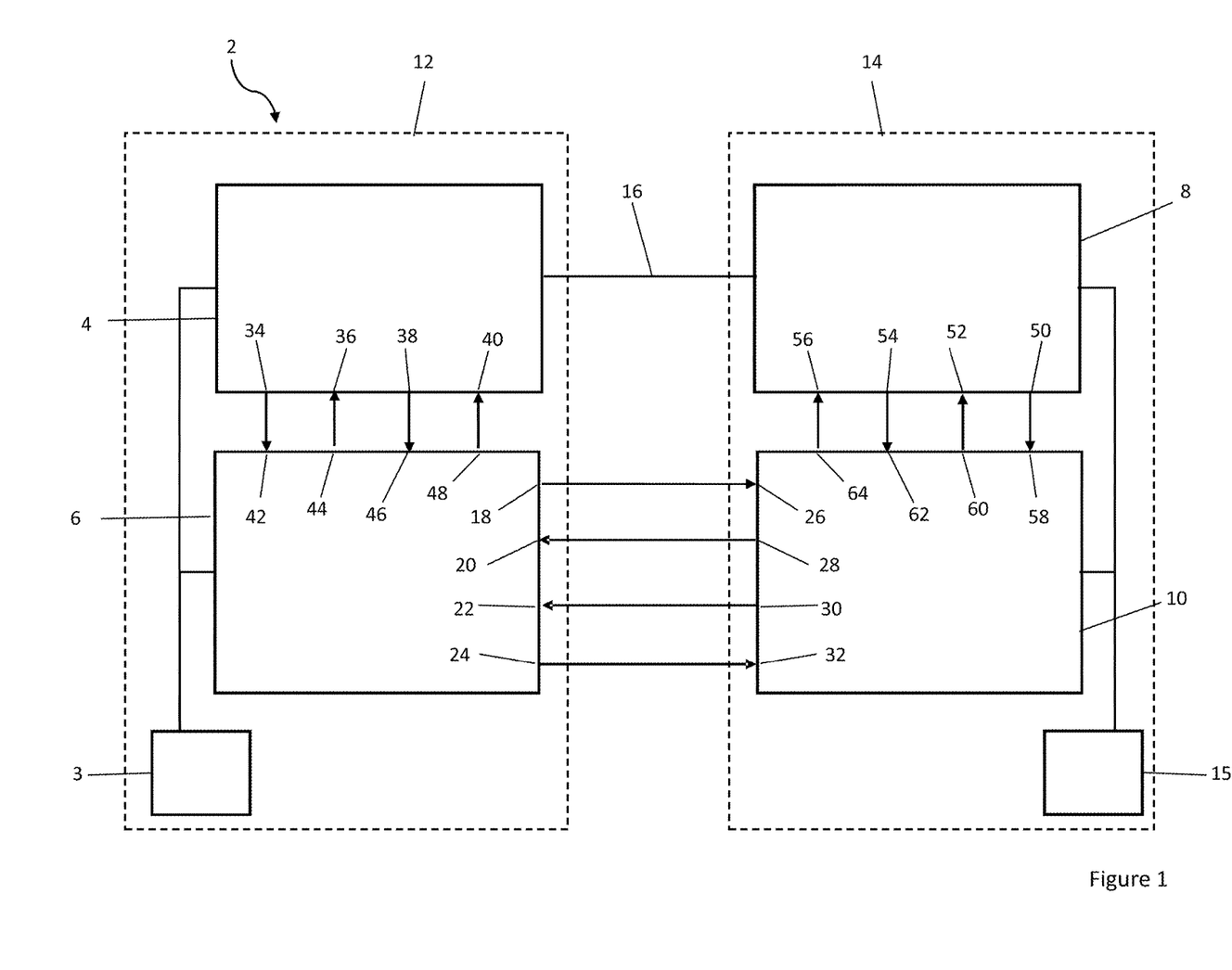
FIG. 1 is a schematic view of a System-on-Chip (SoC) according to an embodiment of the invention.

FIG. 1 shows a System-on-Chip (SoC) 2 comprising a first circuit portion 4, a first handshake circuit portion 6, a second circuit portion 8 and a second handshake circuit portion 10.

The first circuit portion 4 and the first handshake circuit portion 6 operate in a first clock domain 12 clocked by a first clock 3 operating at a first frequency. The second circuit portion 8 and the second handshake circuit portion 10 operate in a second clock domain 14 clocked by a second clock 15 operating a second frequency different to the first frequency. The first and second circuit portions 4, 8 are connected via a data bus 16 comprising a plurality of data lines. However, because the two clock domains 12, 14 operate at different frequencies the data bus 16 cannot be used for conventional synchronous data transfer. Instead, a handshake protocol is used for data transfer, facilitated by the first and second handshake circuit portions 6, 10, as will be described further below.

The first handshake circuit portion 6 comprises a source request signal output 18, a source acknowledge signal input 20, a sink request signal input 22 and a sink acknowledge signal output 24. These are connected with corresponding inputs and outputs of the second handshake circuit portion 10, to allow the handshake procedure to be performed. Specifically, the second handshake circuit portion 10 comprises a sink request signal input 26 connected to the source request signal output 18 of the first handshake circuit portion 6, a sink acknowledge signal output 28 connected to the source acknowledge signal input 20 of the first handshake circuit portion 6, a source request signal output 30 connected to the sink request signal input 22 of the first handshake circuit portion 6, and a source acknowledge signal input 32 connected to the sink acknowledge signal output 24 of the first handshake circuit portion 6.

These connections allow both of the handshake circuit portions 6, 10 to send (i.e. act as a source) and receive (act as a sink) handshake requests and the corresponding acknowledgments. This allows data to be transferred in either direction between the first and second circuit portions 4, 8.

The first circuit portion 4 comprises a source pulse output 34 (i.e. for outputting transmission commands), a sink pulse input 36, a blocking signal output 38 and an overflow signal input 40. Correspondingly, the first handshake circuit portion 6 comprises a source pulse input 42 connected to the source pulse output 34 of the first circuit portion 4, a sink pulse output 44 connected to the sink pulse input 36, a blocking signal input 46 connected to the blocking signal output 38 and an overflow signal output 48 connected to the overflow signal input 40.

Equivalently, the second circuit portion 8 comprises a source pulse output 50, a sink pulse input 52, a blocking signal output 54 and an overflow signal input 56, and the second handshake circuit portion 10 comprises a source pulse input 58, a sink pulse output 60, a blocking signal input 62 and an overflow signal output 64.

The operation of the SoC 2 will now be described with reference to the timing diagrams shown in FIGS. 2 and 3.

Figure 2:
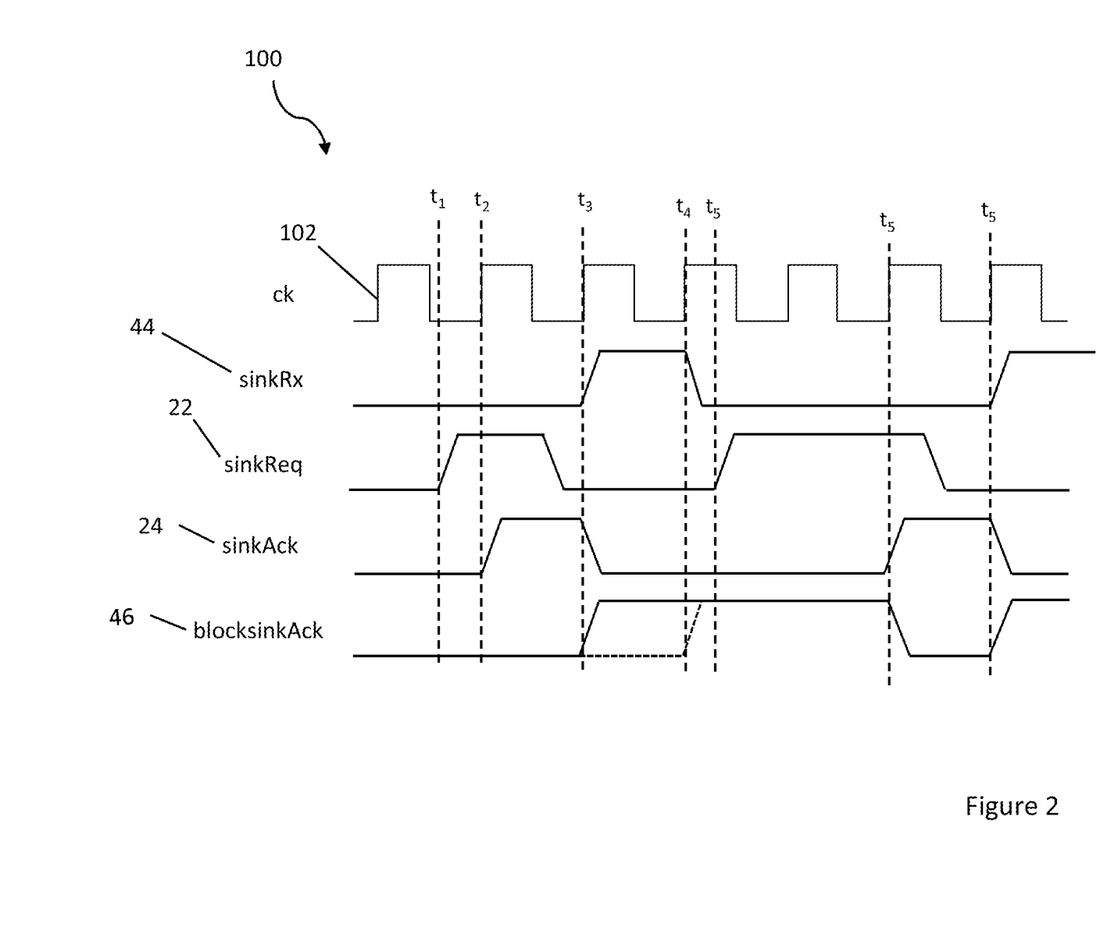
FIGS. 2 and 3 are timing diagrams illustrating the operation of the System-on-Chip of FIG. 1.

FIG. 2 shows a timing diagram 100 illustrating the operation of the first handshake circuit portion 6 acting as a sink (i.e. receiving a handshake request to facilitate data transfer from the second circuit portion 8 to the first circuit portion 4).

FIG. 2 shows the clock signal 102 "ck" of the first clock 3, along with the state of the sink pulse output 44 "sinkRx", the sink request signal input 22 "sinkReq", the sink acknowledge signal output 24 "sinkReq" and the blocking signal input 46 "blockSinkAck".

In use, the second handshake portion 10 starts a handshake procedure for transferring data from the second circuit portion to the first circuit portion by asserting a source request signal (i.e. setting the source request signal output 30 to be HIGH—not shown). This appears on the sink request signal input 22 at time $t_1$ and is detected by the first handshake circuit portion 6. Because the first clock 3 is not synchronised with the second clock 15 this is unlikely to appear in conjunction with a rising edge of the first clock signal 102.

At the next rising edge of the first clock signal 102, $t_2$, the first handshake circuit portion 6 immediately acknowledges the request by asserting an acknowledge signal on the sink acknowledge signal output 24 (setting a logic HIGH). The second handshake circuit portion 10 detects the acknowledge signal and lowers the request signal 22. This lowering of the request signal 22 triggers, at the next rising edge, $t_3$, a sink pulse on the sink pulse output 44, which is received by the first circuit portion 4 (via the sink pulse input 36) and causes the first circuit portion 4 to sample the data present on the data bus 16. Also at $t_3$ the first handshake circuit portion 6 lowers the sink acknowledge signal 24 and the handshake procedure is complete.

Also at $t_3$, in response to receiving the sink pulse 44 via the sink pulse input 36 and thus knowing that the handshake procedure is complete, the first circuit portion 4 asserts a blocking signal on its blocking signal output 38, which appears on the blocking signal input 46 of the first handshaking circuit portion 6. Alternatively (shown with a dotted line), the first circuit portion 4 may assert the blocking signal on its blocking signal output 38 at a later time $t_4$, on the falling edge of the sink pulse 44. This may further ensure that the blocking signal cannot interfere with the preceding handshake procedure. Preferably the blocking signal is set immediately or within a few clock cycles of the sink pulse being triggered to ensure that the acknowledgement of a potential new request is blocked.

The blocking signal indicates that the first circuit portion 4 is processing the data received as a result of the preceding handshake procedure. Its presence on the blocking signal input 46 prevents the first handshaking circuit portion 6 from acknowledging any further request signals (i.e. delaying any future handshake procedures). For instance, at a later time $t_5$, whilst the blocking signal is still asserted, the first handshake portion 6 receives another request signal on the sink request signal input 22. However, this request is not acknowledged immediately due to the blocking signal. Instead, the first handshake circuit portion 6 only asserts an acknowledge signal on the sink acknowledge signal output 24 at a later time $t_6$ when the blocking signal 46 is lowered.

By delaying the acknowledgement until the blocking signal is lowered, the data transfer is made more reliable, as the first handshake portion 6 ensures that the first circuit portion 4 is ready to receive the data associated with the request before acknowledging the request.

Figure 3:
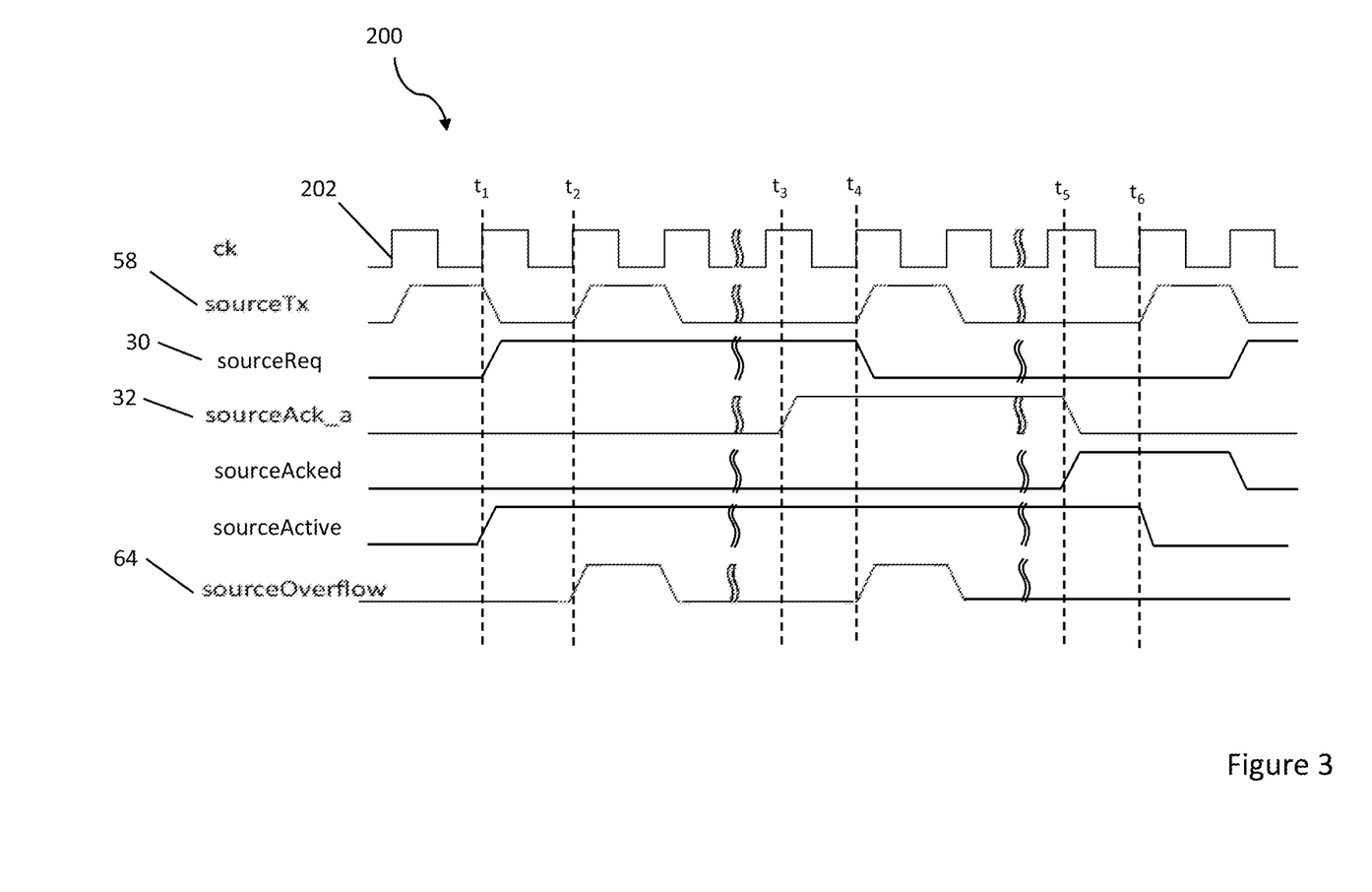

FIG. 3 shows a timing diagram 200 illustrating the operation of the second handshake circuit portion 6 acting as a source (i.e. sending a handshake request to facilitate data transfer from the second circuit portion 8 to the first circuit portion 4).

FIG. 3 shows the clock signal 202 "ck" of the second clock 15, along with the state of the source pulse input 58 "sourceTx", the source request signal output 30 "sourceReq", the source acknowledge signal input 32 "sourceAck_a" and the overflow signal output 64 "sourceOverflow".

FIG. 3 also shows a request acknowledged signal "sourceAcked", which indicates when the acknowledge signal is no longer asserted, and a handshake active signal "sourceActive", which indicates when a handshake procedure is underway.

In use, the second handshake portion 10 starts a handshake procedure for transferring data from the second circuit portion to the first circuit portion in response to a source pulse (i.e. a transmission command) issued to the source pulse input 58 by the second circuit portion 8. At time $t_1$, in response to the source pulse, the second handshake portion 10 asserts a source request signal on the source request signal output 30.

Subsequently, at time $t_2$, the second circuit portion 8 issues another source pulse. However, the source request signal on the source request signal output 30 triggered by the previous pulse is still active and no acknowledgement has been received. It thus is not yet possible to send another source request signal (i.e. to initiate another handshake procedure). However, to avoid errors in the second circuit portion 8, the second handshake circuit portion 10 asserts an overflow signal on the overflow signal output 64, to indicate to the second circuit portion 8 that it is not yet possible to send a new request signal. The second circuit portion 8 can then respond accordingly, potentially avoiding errors and/or data loss.

At a later time $t_3$, the first handshake circuit portion 6 acknowledges the source request signal by asserting an acknowledgement signal on the sink acknowledgement signal output 24 (as described previously with reference to FIG. 2), which appears on the source acknowledgement signal input 32. The second handshake circuit portion 10 then lowers the source request signal 30 on the next rising edge, at time $t_4$.

Also at time $t_4$, the second circuit portion 8 issues another source pulse to the source pulse input 58. However, as before, the previous handshake procedure is still ongoing (the acknowledgement signal is still asserted). Thus, the second handshake circuit portion 10 asserts another overflow signal on the overflow signal output 64, to indicate to the second circuit portion 8 that it is still not yet possible to send a new request signal.

At a later time $t_5$, the first handshake circuit portion 6 detects the lowered request signal on the source request signal output 30 and lowers the acknowledgement signal on the source acknowledge signal input 32, ending the handshake procedure. At time $t_6$, the second circuit portion 8 issues another source pulse to the source pulse input 58. Because the previous handshake procedure is now complete the second handshake portion 10 responds to this by again asserting a source request signal on the source request signal output 30 and the handshake procedure begins again.

Figure 4:
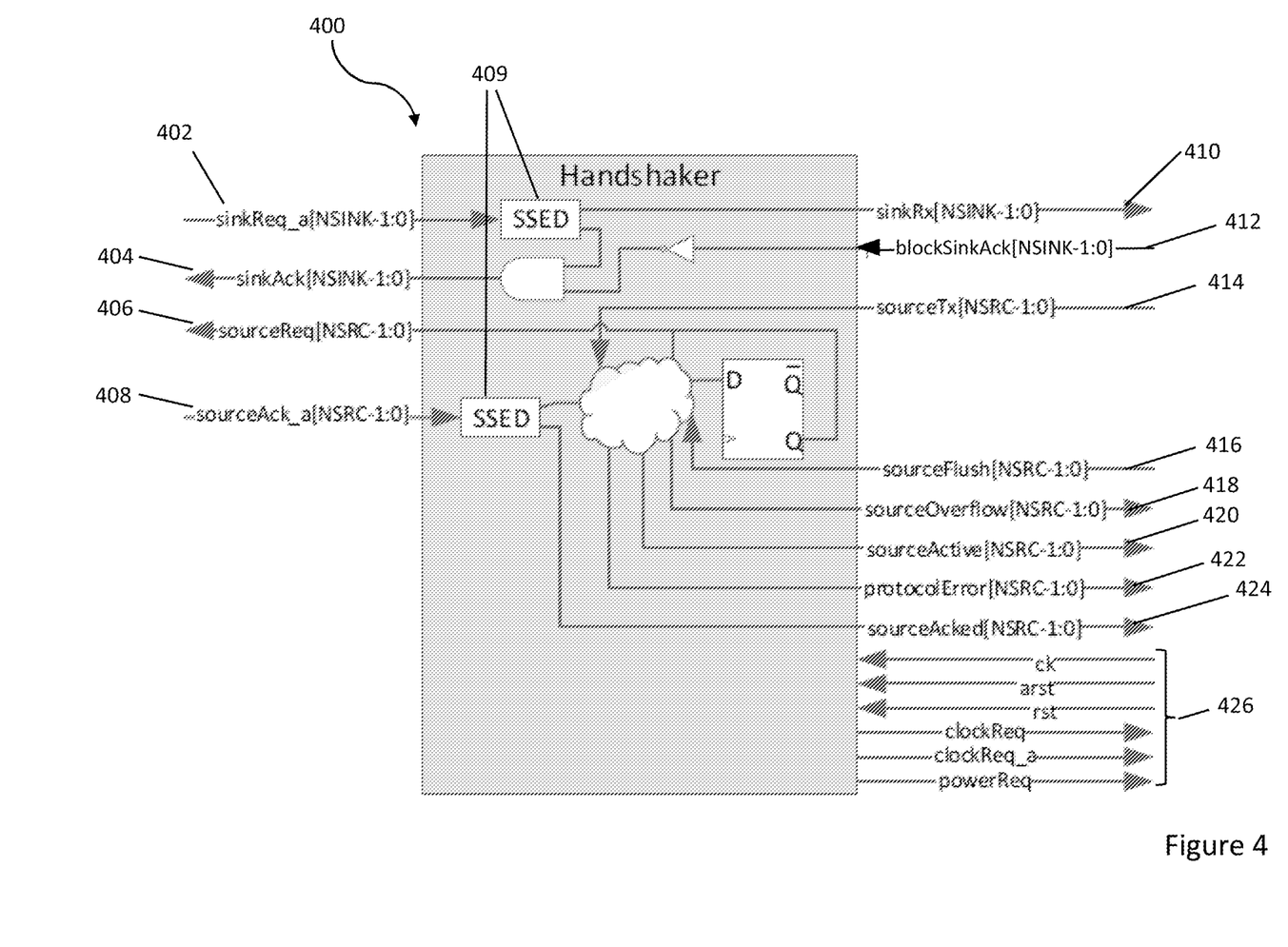
FIG. 4 is a schematic view of a handshake circuit portion according to another embodiment of the invention.

FIG. 4 shows is a schematic diagram of a handshake circuit portion 400 according to another embodiment of the invention. For instance, the handshake circuit portion 400 may act in place of the first or second handshake portion 6, 10 of the embodiment described with reference to FIGS. 1-3.

In common with the previously described embodiment, the handshake circuit portion 400 facilitates the transfer of pulses between power/clock domains. This is performed through request and acknowledge signals. The handshake circuit portion 400 is generally connected in a pair, from source to sink. As seen in FIG. 4, the left-hand side may be connected to a counterpart handshake circuit portion, and the right hand side to a parent circuit portion. The handshake circuit portion 400 may provide a plurality of source (sender) and sink (receiver) connections. In the figure, NSRC is the number of total source connections and NSINK is the number of total sink connections.

The handshake circuit portion 400 comprises four handshake connections for interfacing with another handshake circuit portion. These are a sink request input 402, a sink acknowledge output 404, a source request output 406 and a source acknowledge input 408. Synchronisers 409 (SSED) are provided on the sink request input 402 and the source acknowledge input 408, to ensure that request and acknowledge signals arriving from a different domain (e.g. a different clock or domain) are properly received (i.e. to avoid metastability issues). The synchronisers 409 may, for instance, comprise one or more flip-flops arranged in series.

The handshake circuit portion 400 also comprises a plurality of connections for interfacing with an associated "parent" circuit portion. These are a sink pulse output 410, a blocking signal input 412, a source pulse input 414, a source flush input 416, a source overflow output 418, a source active output 420, a protocol error output 422, a source acknowledged output 424 and various clock and power connections 426.

In use, when transferring a pulse sourceTx[N] through source connection N, sourceReq[N] is set high until sourceAck_a[N] is received, meaning the request has been acknowledged by the other side. sourceActive is a status signal set whenever a source connection is busy. It's busy when sourceReq[N] is set and/or the synchronized sourceAck_a[N] is set. powerReq is set whenever a connection is active. This may be used to request power for the handshake circuit portion 400 itself, and also for the sink counterpart.

Figure 5:
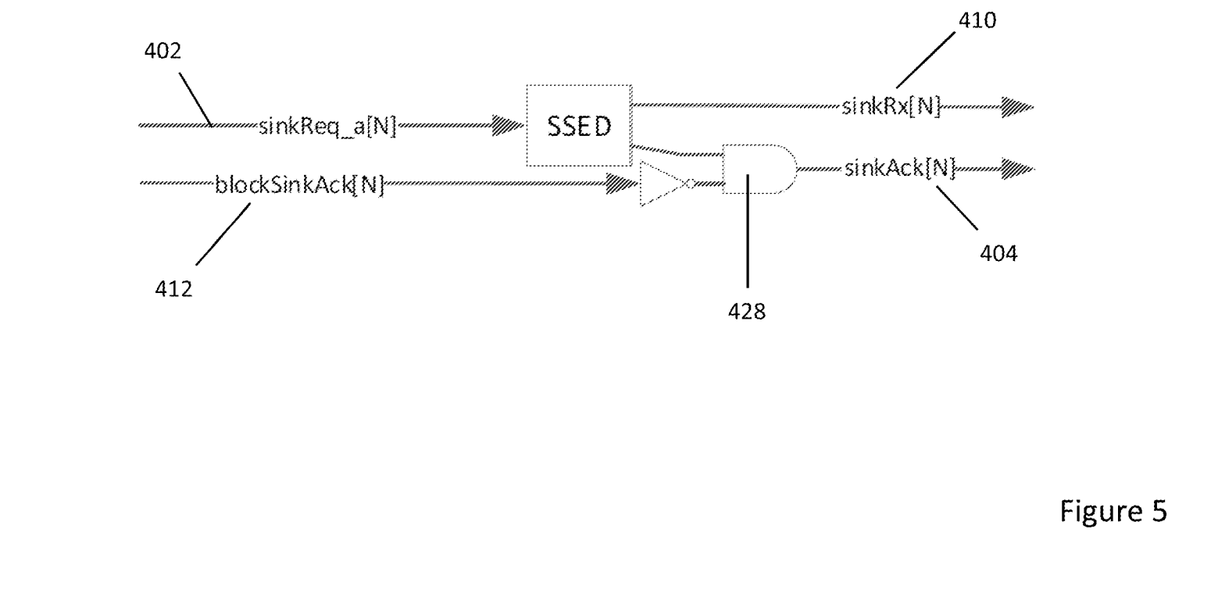
FIGS. 5 and 6 are partial views of the handshake circuit portion shown in FIG. 4.

FIG. 5 is more detailed schematic diagram of part of the handshake circuit portion 400. It can be seen in FIG. 5 that the sink acknowledge output 404 (sinkAck[N]) comprises the output of an AND gate 428 which features the sink request input 402 (sinkReq_a[N]) and an inverted version of the blocking signal input 412 (blockSinkAck[N]) as inputs. This may provide an implementation of the blocking functionality described above with reference to FIG. 2.

Figure 6:
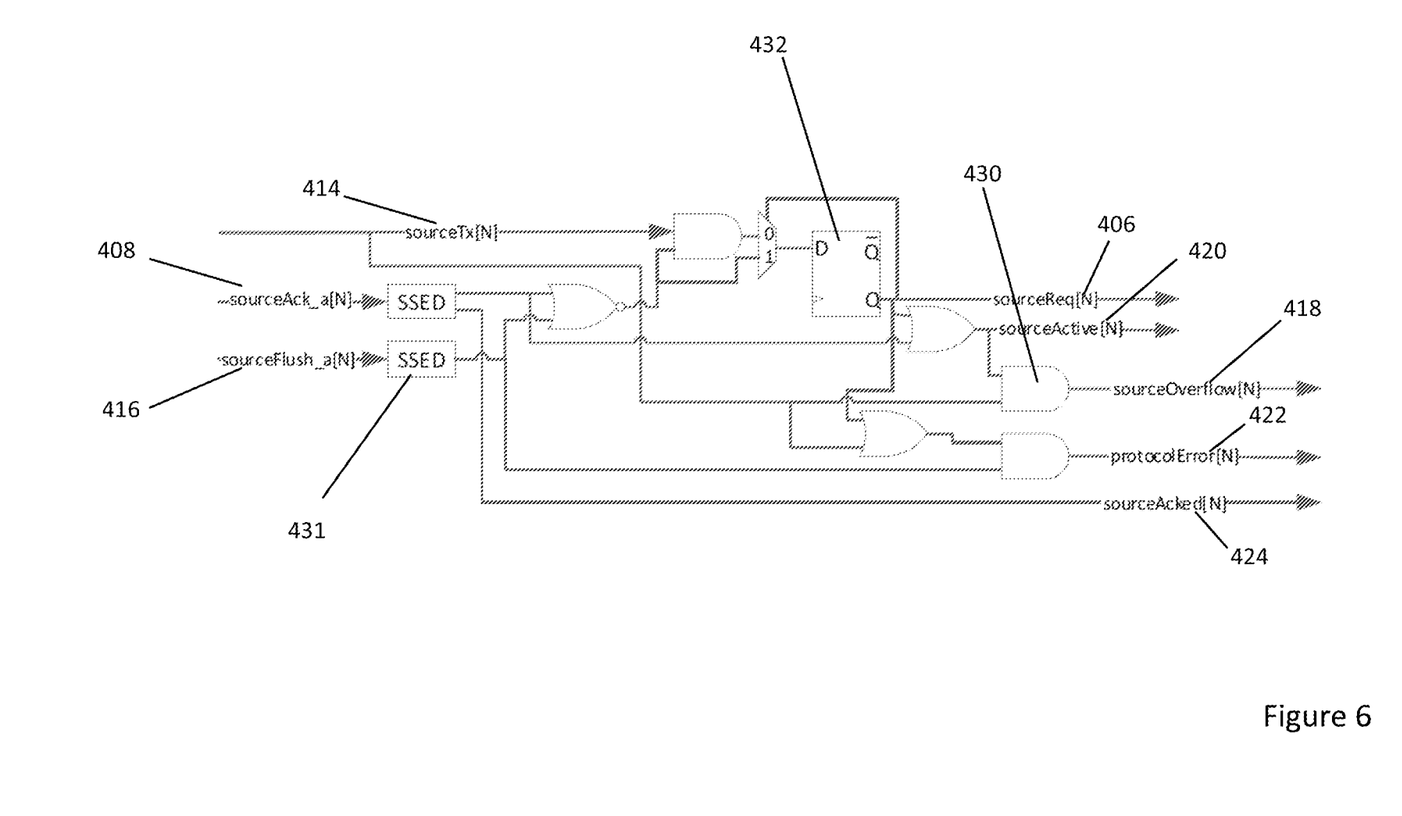

FIG. 6 is more detailed schematic diagram of part of the handshake circuit portion 400. It can be seen in FIG. 5 that the source overflow output 418 (sourceOverflow[N]) output comprises the output of an AND gate 430 which features the source active output 420 (sourceActive[N]) and the source pulse input 414 (sourceTx[N]) as inputs. This may provide an implementation of the overflow functionality described above with reference to FIG. 3.

As seen in FIG. 6, a synchroniser 431 (SSED) is also provided on the source flush input 416 (sourceFlush_a[N]).

Operation of the handshake circuit portion shown in FIGS. 4-6 will now be described with reference to the timing diagram 700 shown in FIG. 7.

In operation, a source pulse (i.e. a transmission command) is received by the handshake circuit portion 400 via the source pulse input 414 (e.g. from an associated circuit portion). The source pulse is stored in a flip flop 432, which sets the source request output 406 (i.e. to be detected by a counterpart handshake circuit portion acting as a sink). This flip flop 423 is cleared by an acknowledge signal received (i.e. from the counterpart handshake circuit portion) on the source acknowledge input 408 (sourceAck_a[N]), or by a flush signal on the source flush input 416 (sourceFlush_a[N]). The source connection is active when the source request is set (i.e. when a request signal is asserted on the source request output 406) or the synchronized acknowledge signal is set (i.e. when an acknowledge signal is detected on the acknowledge signal input 408). If the source connection is active, a new source pulse received by the source pulse input 414 results in an overflow signal being sent via the source overflow output 418. An active source connection causes the powerReq output to be asserted to indicate that the handshake circuit portion 400 requires power.

Figure 7:
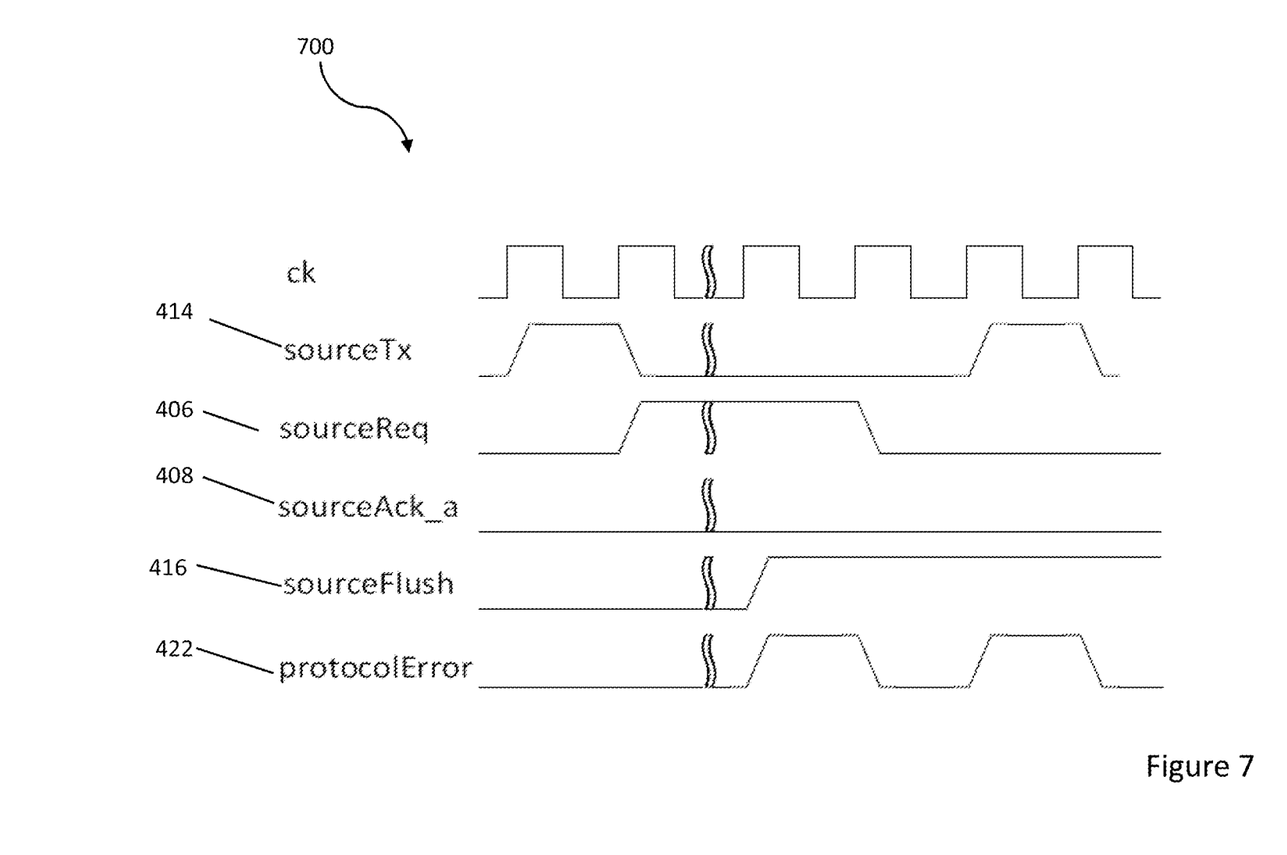
FIG. 7 is a timing diagram illustrating an operation of the handshake circuit portion shown in FIGS. 4-6.

As seen in FIG. 7, a protocol error signal on the protocol error output 422 (protocolError[N]) is generated when a flush signal is detected on the source flush input 416 at the same time as a source request is asserted on the source request output 406 or a source pulse is received on the source pulse input 414. When the acknowledge signal on the acknowledge signal input 408 falls, signaling that a transfer has completed, a pulse on the source acknowledged output 424 is generated.

When the handshake circuit portion 400 is used between two domains that can be forced off independently, for example between two independent blocks that don't have control of the state of each other, a flush by sourceFlush_a[N] may optionally be performed (e.g. by an associated circuit portion) to clear any ongoing transfers and block new transfers. This way the handshake circuit portion 400 acting as a source will drop its request so it's able to go to sleep, and future source pulses will be blocked. The source flush input 416 signal may be assigned permanently to '0' when the handshake circuit portion 400 is used between dependent power domains. If a flush signal is detected while a handshake is ongoing, or when a new handshake begins, a pulse is generated on protocolError[n]. The flush signal aborts the source request, and sets the protocol error signal, and a new source pulse also sets the protocol error.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A handshake circuit portion for performing a handshake procedure to facilitate data reception by an associated circuit portion comprising:

a request signal input for detecting a request signal from a further handshake circuit portion associated with a further circuit portion;
an acknowledge signal output for asserting an acknowledge signal for the further handshake circuit portion;
a blocking signal input for detecting a blocking signal from the associated circuit portion;
wherein the handshake circuit portion is arranged to:
detect a request signal via the request signal input;
determine if a blocking signal is present on the blocking signal input; and
if a blocking signal is not present on the blocking signal input, respond to the request signal by asserting an acknowledge signal via the acknowledge signal output.

2. The handshake circuit portion as claimed in claim 1 comprising an AND logic gate with the request signal input and an inverted version of the blocking signal input as inputs, and the acknowledge signal output as an output.

3. The handshake circuit portion as claimed in claim 1 comprising one or more synchronisation components provided on the request signal input.

4. A circuit system comprising:
a first circuit portion;
a first handshake portion as claimed in claim 1 associated with the first circuit portion;
a second circuit portion connected to the first circuit portion by one or more data lines; and
a second handshake circuit portion associated with the second circuit portion;
wherein the first and second handshake circuit portions are arranged to perform a handshake procedure comprising request and acknowledge signals to facilitate data transfer from the second circuit portion to the first circuit portion using the one or more data lines.

5. The circuit system as claimed in claim 4 wherein the first handshake circuit portion and the first circuit portion operate in a first domain and the second handshake circuit portion and the second circuit portion operate in a second, different domain.

6. The circuit system as claimed in claim 4 comprising a first clock with a first frequency that is arranged to clock a first clock domain comprising the first handshake circuit portion and the first circuit portion; and a second clock with a second frequency that is arranged to clock a second clock domain comprising the second handshake circuit portion and the second circuit portion.

7. The circuit system as claimed in claim 4 wherein the first circuit portion is operable to transfer data to the second circuit portion using the one or more data lines.

8. The circuit system as claimed in claim 7 wherein the second handshake circuit portion also comprises a handshake circuit portion comprising a blocking signal input for detecting a blocking signal from the second circuit portion.

9. The circuit system as claimed in claim 4 wherein the second handshake circuit portion comprises:
a request signal output for asserting a request signal to the first handshake circuit portion;
an acknowledge signal input for detecting an acknowledge signal from the first handshake circuit portion;
a source command input for receiving a transmission command from the second circuit portion;
an overflow signal output for sending an overflow signal to the second circuit portion;
wherein the second handshake circuit portion is arranged:
upon receipt of a transmission command from the second circuit portion via the source command input, to perform a handshake procedure with the first handshake circuit portion by asserting a request signal via the request signal output and detecting an acknowledge signal via the acknowledge signal input; and
to send an overflow signal to the second circuit portion via the overflow signal output if a further transmission command is received via the source command input before the handshake procedure is complete.

10. The circuit system as claimed in claim 4 wherein the second handshake circuit portion is arranged to lower the request signal on detection of the acknowledge signal.

11. The circuit system as claimed in claim 10 wherein the first handshake circuit portion is arranged to lower the acknowledge signal after the request signal is lowered.

12. The circuit system as claimed in claim 4 wherein the second handshake circuit portion is arranged to provide an indication of when the handshake procedure is in progress.

13. The circuit system as claimed in claim 12 wherein the second handshake circuit portion comprises a handshake active signal output for asserting a handshake active signal.

14. The circuit system as claimed in claim 13 wherein the second handshake circuit portion is arranged to assert said handshake active signal when a request signal is asserted on the request signal output and/or when an acknowledge signal is detected on the acknowledge signal input.

15. The circuit system as claimed in claim 14 wherein the second handshake circuit portion comprises an AND logic gate with the handshake active signal output and the source command input as inputs, and the overflow signal output as an output.

16. The circuit system as claimed in claim 4 wherein the first handshake circuit portion comprises:
a request signal output for asserting a request signal to the second handshake circuit portion;
an acknowledge signal input for detecting an acknowledge signal from the second handshake circuit portion;
a source command input for receiving a transmission command from the first circuit portion;
an overflow signal output for sending an overflow signal to the first circuit portion;
wherein the first handshake circuit portion is arranged to:
receive a transmission command from the first circuit portion via the source command input;
perform a handshake procedure with the second handshake circuit portion by asserting a request signal via the request signal output and detecting an acknowledge signal via the acknowledge signal input; and
send an overflow signal to the first circuit portion via the overflow signal output if a further transmission command is received via the source command input before the handshake procedure is complete.

17. The circuit system as claimed in claim 4 wherein the second handshake circuit portion comprises:
a request signal input for detecting a request signal from the first handshake circuit portion;
an acknowledge signal output for asserting an acknowledge signal for the first handshake circuit portion;
a blocking signal input for detecting a blocking signal from the second circuit portion;
wherein the handshake circuit portion is arranged to:
detect a request signal via the request signal input;
determine if a blocking signal is present on the blocking signal input; and
if a blocking signal is not present on the blocking signal input, respond to the request signal by asserting an acknowledge signal via the acknowledge signal output.

18. A method for transferring data from a second circuit portion associated with a second handshake portion to a first circuit portion associated with a first handshake portion, the method comprising:
the second circuit portion asserting a data signal;
the first and second handshake circuit portions performing a handshake procedure; and
the first circuit portion receiving the data signal;
wherein the handshake procedure comprises:
the second handshake circuit portion asserting a request signal;
the first handshake circuit portion detecting the request signal;
the first handshake circuit portion determining whether the first circuit portion is ready to receive the data signal; and
if the first circuit portion is ready to receive the data signal, the first handshake circuit portion asserting an acknowledgement signal.

19. The method as claimed in claim 18 wherein the first handshake circuit portion determining whether the first circuit portion is ready to receive the data signal comprises detecting whether a blocking signal is asserted by the first circuit portion.

20. The method as claimed in claim 18 further comprising:
the second handshake circuit portion initiating the handshake procedure by asserting the request signal in response to a transmission command from the second circuit portion;
the second handshake circuit portion receiving a further transmission command from the second circuit portion; and
the second handshake circuit portion sending an overflow signal to the second circuit portion, if the further transmission command is received before the handshake procedure is complete.

* * * * *